(12) United States Patent
Burckart et al.

(10) Patent No.: US 7,730,269 B2
(45) Date of Patent: Jun. 1, 2010

(54) LOAD MANAGEMENT TO REDUCE COMMUNICATION SIGNALING LATENCY IN A VIRTUAL MACHINE ENVIRONMENT

(75) Inventors: Erik John Burckart, Raleigh, NC (US); Curtis E. Hrischuk, Holly Springs, NC (US); Brian Keith Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 11/468,141

(22) Filed: Aug. 29, 2006

(65) Prior Publication Data

US 2008/0059747 A1 Mar. 6, 2008

(51) Int. Cl.
*G06F 12/00* (2006.01)
*G06F 13/00* (2006.01)
*G06F 13/28* (2006.01)

(52) U.S. Cl. .................. 711/154; 709/224; 707/206; 707/204; 711/170

(58) Field of Classification Search .......... 707/206; 711/170, 154
See application file for complete search history.

(56) References Cited

U.S. PATENT DOCUMENTS

| | | | | |
|---|---|---|---|---|
| 5,485,613 A | * | 1/1996 | Engelstad et al. | 707/206 |
| 5,537,618 A | * | 7/1996 | Boulton et al. | 715/745 |
| 6,834,386 B1 | * | 12/2004 | Douceur et al. | 718/107 |
| 6,999,469 B1 | | 2/2006 | Chu et al. | |
| 7,171,482 B2 | * | 1/2007 | Jones et al. | 709/231 |
| 2002/0103898 A1 | * | 8/2002 | Moyer et al. | 709/224 |
| 2003/0005174 A1 | | 1/2003 | Coffman et al. | |
| 2003/0088421 A1 | | 5/2003 | Maes et al. | |
| 2004/0111448 A1 | * | 6/2004 | Garthwaite | 707/206 |
| 2005/0240641 A1 | * | 10/2005 | Kimura et al. | 707/206 |
| 2006/0085494 A1 | * | 4/2006 | Dussud et al. | 707/206 |

OTHER PUBLICATIONS

Rodriguez et al., "On the Feasibility of Commercial, Legal P2P Content Distribution", ACM SIGCOMM Computer Communication Review, vol. 36, No. 1, Jan. 2006, pp. 75-78.
Ho et al., "A Conference Gateway Supporting Interoperability Between SIP and H.323", MM'01, Sep. 2001, Ottawa Canada, ACM 1-581, , pp. 421-430.

* cited by examiner

*Primary Examiner*—Stephen C Elmore
*Assistant Examiner*—Mark A Giardino, Jr.
(74) *Attorney, Agent, or Firm*—Patents On Demand, P.A.; Scott M. Garrett

(57) ABSTRACT

A computer implemented method for reducing communication signaling protocol latency. An acceptable level of latency is specified. Automatic memory management activities are monitored based on specified parameters to calculate a level of activity that determines whether a reduction of activity is required.

16 Claims, 3 Drawing Sheets

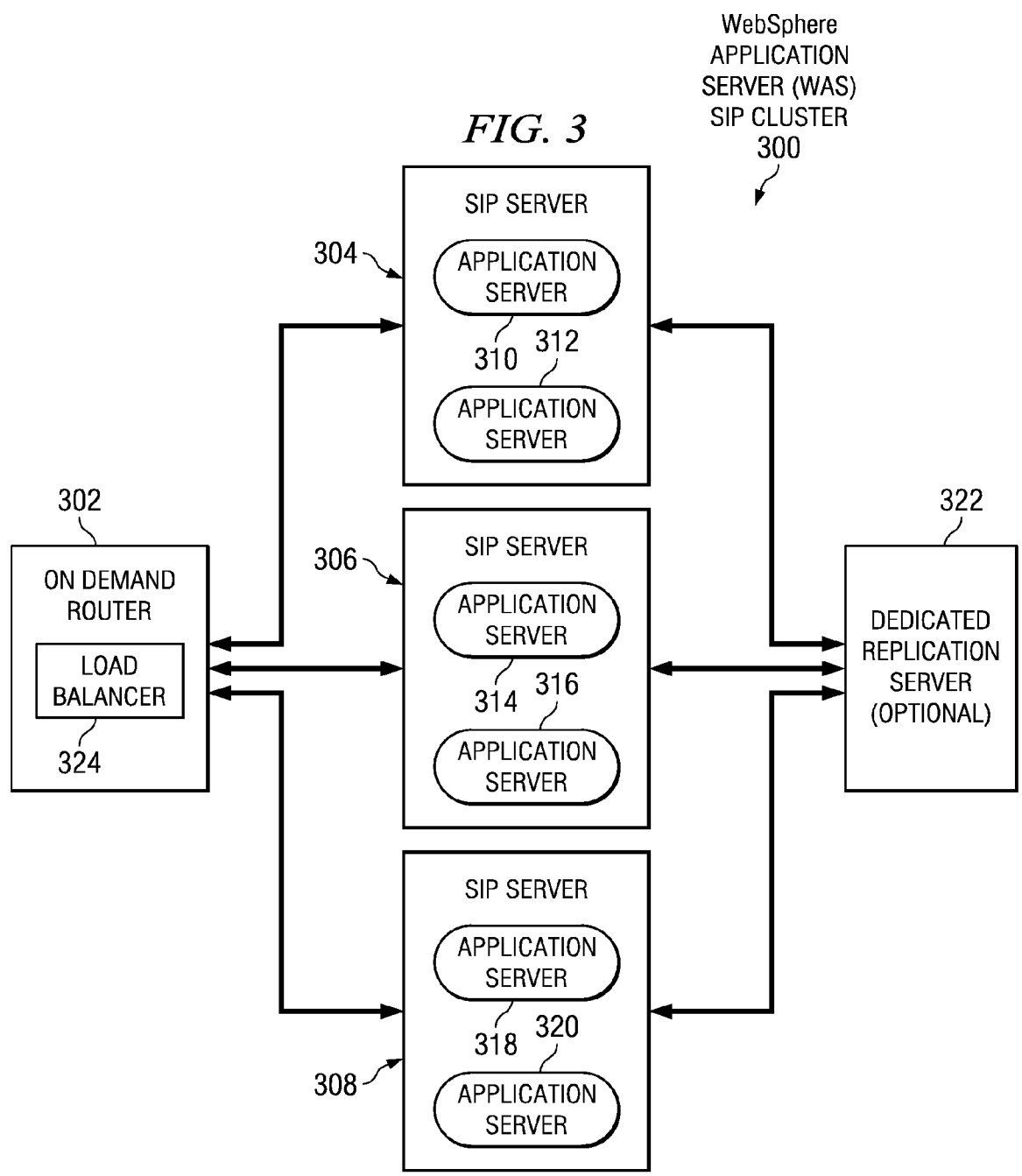

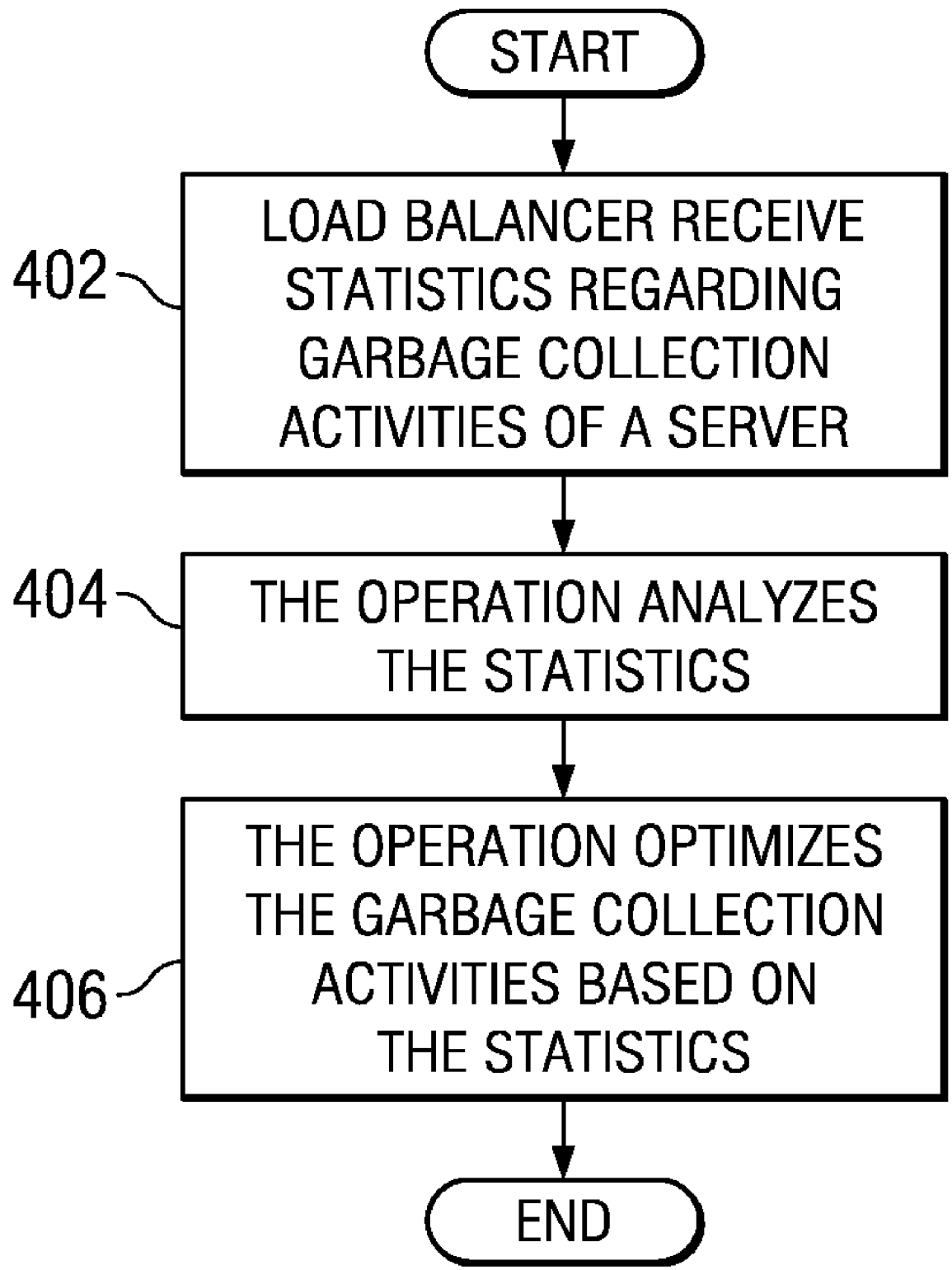

LOAD MANAGEMENT TO REDUCE COMMUNICATION SIGNALING LATENCY IN A VIRTUAL MACHINE ENVIRONMENT

BACKGROUND OF THE INVENTION

1. Field of the Invention

The present invention relates generally to a data processing system. More specifically, the present invention relates to a computer implemented method, computer program product and data processing system for reducing communication signaling protocol latency.

2. Description of the Related Art

The session initiation protocol(SIP) is being implemented in the Java language, for example, SIP container in WebSphere, and being used by service providers. Session initiation protocol (SIP) is an Internet signaling protocol which has many uses, such as Voice over IP (VoIP). Session initiation protocol (SIP) can establish sessions for features such as audio/videoconferencing, interactive gaming, and call forwarding to be deployed over networks thus enabling service providers to integrate basic telephony services with Web, e-mail, and chat services. Session initiation protocol (SIP) is an example of a communication signaling protocol. Session initiation protocol (SIP) has quality of service (QoS) requirements. Customers are concerned about end-to-end latency. In particular, customers would like deterministic latency and they are willing to reduce throughput to get more deterministic latency.

A problem in providing deterministic latency in a virtual machine environment, such as Java, C#, Lisp, Perl, and so forth, is that garbage collection events occur that stop all application processing for a period of time. Garbage collection is a form of automatic memory management. Memory management is the act of managing computer memory. In its simpler forms memory management involves providing ways to allocate portions of memory to programs at their request and free the portions of memory back to the system for reuse when the portions of memory are no longer needed. A garbage collector or collector attempts to reclaim garbage, or memory used by objects that will never again be accessed or mutated by the application. Memory can be allocated and used, and the garbage collection process will automatically free any chunks of memory that are no longer referenced. Typically, garbage collection involves the automatic reclamation of dynamically allocated objects that are no longer accessible. This 'stop the world' garbage collection time is based on the amount of heap used and the number of objects created.

One approach to solving this 'stop the world' garbage collection time is to oversize the number of CPU's used by the system, which is not very cost effective. Another solution is to measure an application's garbage collection activity and tune the garbage collection algorithm. However, this solution can only go so far. Another solution is to have a scheduled, periodic thread that performs garbage collection activities. An input to this thread is the frequency and length at which the periodic garbage collection thread operates.

However, a concern still remains that the workload could over-run the capacity of the periodic garbage collection thread when the input rate spikes and the object creation rate exceeds the rate at which the periodic garbage collection thread can perform garbage collection activities. It is desirable to solve this problem in a manner that would also supplement existing garbage collection algorithms, that is generational garbage collection, because the existing algorithms do have a low priority, background thread that performs garbage collection activities.

BRIEF SUMMARY OF THE INVENTION

Exemplary embodiments describe a computer implemented method, a computer program product and a data processing system for reducing communication signaling protocol latency. Automatic memory management activities are optimized based on a specified level of latency.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of components for reducing communication signaling protocol latency in accordance with an exemplary embodiment; and FIG. 4 is a flowchart illustrating the operation of reducing session initiation protocol latency in a Java environment in accordance with an exemplary embodiment.

DETAILED DESCRIPTION OF THE INVENTION

Figure 1:
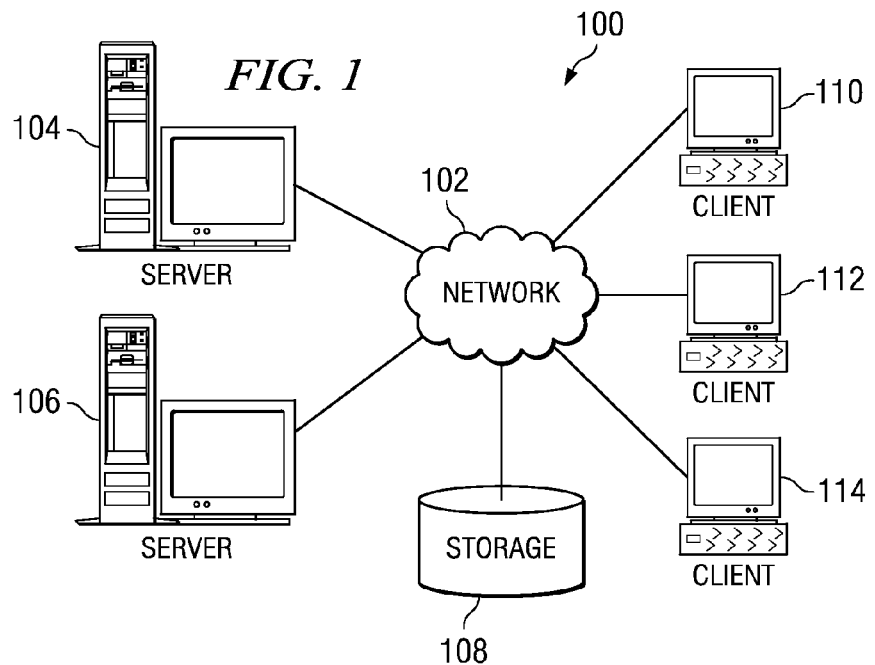
FIG. 1 is a pictorial representation of a network of data processing systems in which exemplary aspects may be implemented.
Figure 2:
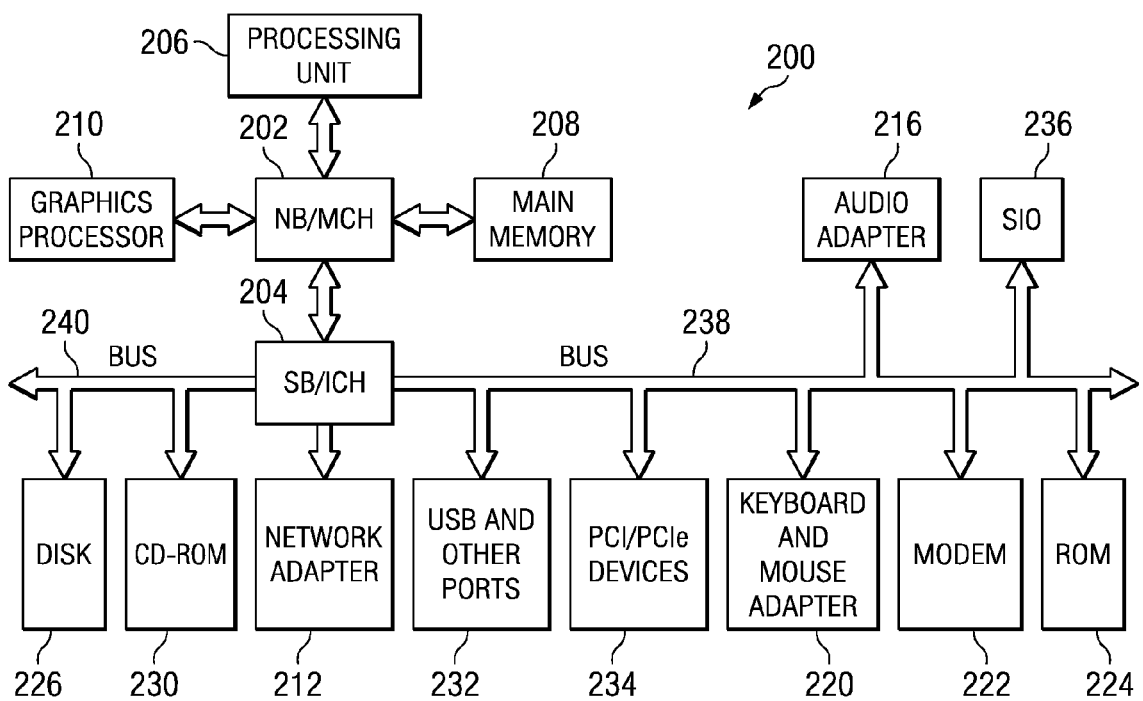
FIG. 2 is a block diagram of a data processing system in which exemplary aspects may be implemented.

FIGS. 1-2 are provided as exemplary diagrams of data processing environments in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope.

With reference now to the figures, FIG. 1 depicts a pictorial representation of a network of data processing systems in which aspects may be implemented. Network data processing system 100 is a network of computers in which exemplary embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

An exemplary embodiment provides reducing communication signaling protocol latency. Latency, which is a synonym for delay, is an expression of how much time it takes for a packet of data to get from one designated point to another designated point. In an exemplary embodiment, a load balancer monitors the rate at which heap is being consumed, objects are being generated, average garbage collection time, and the rate of garbage collection activity that a background garbage collection thread is doing. Heap is a large block of process memory typically managed by a runtime library. Application memory requests are satisfied from the heap and its runtime routines. The load balancer has a filter that will throttle the acceptance of requests if the garbage collection background thread either cannot keep up with specified parameters or the average or maximum garbage collection time is above or approaching a certain threshold. Throttle means to regulate or slow down a sender. In the present exemplary embodiment, throttle means to slow the rate of acceptance of requests. This throttling of request acceptance trades off throughput for achieving and maintaining deterministic latency.

Exemplary embodiments function in an on demand router (ODR), which includes a load balancer. Another exemplary embodiment functions with the current J9 generational garbage collection.

Turning back to the figures, FIG. 3 is a block diagram of components reducing communication signaling protocol latency in accordance with an exemplary embodiment. Exemplary embodiments may be implemented in any virtual machine based language that has garbage collection. Other exemplary embodiments may be implemented in any load balancing environment.

WebSphere application server (WAS) SIP cluster 300 is comprised of on demand router 302 in front and three hardware (h/w) servers SIP server 304, 306, and 308, that have two WebSphere application servers, app svr 310, 312, 314, 316, 318, and 320, running on each h/w server. The WebSphere application server is a world class J2EE compliant application server platform that supports dynamic content and Java web applications. The WebSphere application server combines enterprise-level data and transactional services with business information to provide a robust web site infrastructure. The applications are session initiation protocol related. Applications that are session initiation protocol (SIP) related include those applications that only use session initiation protocol (SIP) as well as applications that may have a small use of session initiation protocol (SIP) but are based on other technologies as well. Optionally, WAS SIP cluster 300 includes a dedicated replication server 322.

The load balancer 324, which is part of on demand router 302, maintains a running average and other statistics of the following parameters:

T—Time to perform a garbage collection activity that 'stops the world'.
Hp—Total heap allocation per user request.
Op—Total number of objects created per user request.
Ot—Rate of object reclamation by the garbage collection thread.
Ht—Rate of heap reclamation by the garbage collection thread.
R—Rate of input requests.
P—Hardware platform characteristics (e.g., number of CPU's, type of CPU).
U—Performance measurements of the hardware server upon which the application server is located (e.g., CPU utilization).

The input parameters to the filter are as follows:

Lh—acceptable latency due to slowness of heap reclamation, which may be either an average or maximum amount.
Lo—acceptable latency due to slowness of object reclamation, which may be either an average or maximum amount.

There are two functions that need to be developed. The two functions are usually developed by empirical measurements, along with platform scaling information. The functions may be, for example, a lookup table. The first function, function F1, returns the expected garbage collection latency due to the heap that needs to be scanned when a garbage collection event occurs. The first function takes as input the rate at which the heap is being consumed by input requests, the rate at which it is being reclaimed by the garbage collection thread, the hardware platform characteristics, and the environmental performance measurements on that hardware (h/w) server, for example, CPU utilization that is not due to the application server and is outside the Java virtual machine's (JVM's) control.

The second function, function F2, returns the expected garbage collection latency due to the objects not gathered when a garbage collection event is triggered. The second function takes as input the rate at which the objects are created by the input requests, the rate at which objects are being reclaimed by the garbage collection thread, the hardware platform characteristics, and the environmental performance measurements on that h/w server, for example, CPU utilization that is not due to the application server and is outside the Java virtual machine's (JVM's) control.

The algorithm for optimizing the garbage collection activity for each application server becomes:

```
for each application server
    If[F1(R*Hp,P,U,Ht)<Lh]&&[F2(R*Op,P,U,Ot)<LO]
    then
            send user request to application server
    else
    if each application server in the cluster has
    been tried without success
            then
                    reject the request
            else
                    next application server
            endif
    endif
endfor
```

In an exemplary embodiment the two functions are combined into a single implementation.

In session initiation protocol (SIP), there are two types of messages that may be important to refuse in the case where the servers are too busy. One message type that may be refused is any session initiation protocol (SIP) message which is an indiscriminate message, or a message that applies to all sessions. Another type of message that may be refused is a session initiation protocol (SIP) message which begins a new session initiation protocol (SIP) session.

In the case of a refused indiscriminate message, the message will be retransmitted after some timer period, which will introduce a delay. In the case of a refused session initiation protocol (SIP) message that begins a new session initiation protocol (SIP) session, any sessions which are active will still receive their messages so they will not experience any delay but any new sessions will either be outright rejected or need to wait for the protocol retransmission.

In an exemplary embodiment, the algorithm for optimizing garbage collection activity for each application server, which also takes into account the variations mentioned above may be implemented as:

```
for each application server
    If bypass condition=false and
    [F1(R*Hp,P,U,Ht)<Lh]&&[F2(R*Op,P,U,Ot)<LO]
    then
            send user request to application server
    else
    if each application server in the cluster has
    been tried without success
            then
                    reject the request
            else
                    next application server
            endif
    endif
endfor
```

In the above algorithm, the bypass condition is automatically set to fault unless some bypass condition is met, which sets the bypass condition to true. A bypass condition is any one of a number of conditions that may be used to cause the algorithm to refuse acceptance of the message. As an example, the bypass condition may be a message to start a new session, as explained above. In such a case, when a message to start a new session is received, the bypass condition becomes true and the message is thus refused, and not processed by the algorithm.

The description of the algorithm has been presented for purposes of illustration and description, and is not intended to be exhaustive or to limit the algorithm to the form disclosed.

Many modifications and variations will be apparent to those of ordinary skill in the art. The embodiments described were chosen and described in order to best explain the principles of the implementation of the algorithm, the practical application, and to enable others of ordinary skill in the art to understand the algorithm for use in various embodiments with various modifications as are suited to the particular use contemplated. For example, the algorithm may be easily modified to encompass prioritizing the order in which to try the various application servers. All such subtle variations are contemplated and intended to be included in the scope of various exemplary embodiments.

FIG. 4 is a flowchart illustrating the operation of reducing session initiation protocol latency in a Java environment in accordance with an exemplary embodiment. The operation of FIG. 4 may be implemented by an on demand router, such as on demand router 302 in FIG. 3 and more specifically by a load balancer, such as load balancer 324 in FIG. 3. The operation begins when the load balancer receives statistics regarding garbage collection activities of a server (step 402). Next the operation analyzes the statistics (step 404), and optimizes the garbage collection activities based on the statistics (step 406), whereupon the operation ends.

Optimization of the garbage collection activities can be either proactive or reactive in nature. That is, garbage collection activities could be optimized based on the current statistics in order to handle the current garbage collection needs of the system. Alternatively, the statistics may be used to predict the future garbage collection needs of the system. The garbage collection activities may then be optimized to meet the predicted future garbage collection needs of the system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of optimizing an internet signaling protocol latency of an application server, the computer implemented method comprising:

receiving a plurality of application memory requests at a load balancer associated with the application server;

calculating, at the load balancer, an automatic memory management latency based on an automatic memory management activity in response to receiving each of the application memory requests;

evaluating, at the load balancer, based on the calculated automatic memory management latency, whether the automatic memory management latency is within a specified threshold that is acceptable for the internet signaling protocol latency of the application server, wherein the internet signaling protocol latency is based on the automatic memory management latency; and throttling an application memory request acceptance rate of the application memory requests at the load balancer based on a result of the evaluation which indicates the automatic memory management latency exceeds the specified threshold.

2. The computer implemented method of claim 1, wherein the calculated latency is based on a heap that is scanned upon an occurrence of a garbage collection event.

3. The computer implemented method of claim 1, wherein the calculated latency is based on a rate of object reclamation by a garbage collection event.

4. The computer implemented method of claim 1, wherein the internet signaling protocol comprises a session initiation protocol (SIP).

5. The computer implemented method of claim 1, wherein calculating the automatic memory management latency comprises:

developing a first function that inputs a rate of consumption of a heap by input requests, a rate at which the heap is being reclaimed by the automatic memory management activity, a hardware platform characteristic, and a performance measurement of a hardware server on the platform; and developing a second function that inputs a rate at which objects are created by input requests, a rate at which objects are being reclaimed by a garbage collection thread, the hardware platform characteristic, and the performance measurement of the hardware server on the platform.

6. The computer implemented method of claim 5, wherein the evaluation comprises determining whether a result of the second function is less than an acceptable internet signaling protocol latency based on a slowness of object reclamation.

7. The computer implemented method of claim 6, wherein the evaluation comprises determining whether a result of the first function is less than an acceptable internet signaling protocol latency based on a slowness of heap reclamation.

8. The computer implemented method of claim 1, wherein throttling an application memory request acceptance rate comprises rejecting memory request.

9. The computer implemented method of claim 1, further comprising predicting a future automatic memory management activity based on the evaluation.

10. The computer implemented method of claim 6, wherein receiving the plurality of application memory requests comprises receiving at one application server, and responsive to determining that the second function is less than an acceptable internet signaling protocol latency based on a slowness of object reclamation and the first function is less than an acceptable internet signaling protocol latency based on a slowness of heap reclamation, sending the memory request to another application server.

11. The computer implemented method of claim 1, wherein the automatic memory management activity comprises a garbage collection activity.

12. The computer implemented method of claim 11, wherein throttling the application memory request acceptance rate further comprises determining if an average garbage collection activity time is above a specified threshold.

13. A method for accepting application memory requests for an application server at a load balancer associated with the application server, the application memory requests consuming heap memory associated with the application server, the method comprising:

receiving an application memory request at the load balancer;

determining a first function related to an expected garbage collection latency based on an amount of heap that needs to be scanned during a garbage collection event;

determining a second function related to an expected garbage collection latency based on a number of objects in the heap that are not collected during the garbage collection event; and wherein determining the first and second functions are performed at the load balancer;

rejecting the application memory request at the load balancer when the first and second functions exceed respective first and second thresholds; and accepting the application memory request at the load balancer when the first and second functions are under the first and second thresholds, respectively.

14. The method of claim 13, wherein:

determining the first function inputs a rate of consumption of the heap by input requests, a rate at which the heap is being reclaimed by the automatic memory management activity, a hardware platform characteristic, and a performance measurement of a hardware server on the platform; and determining the second function inputs a rate at which objects are created by input requests, a rate at which objects are being reclaimed by a garbage collection thread, the hardware platform characteristic, and the performance measurement of the hardware server on the platform.

15. The method of claim 14 wherein determining the second function comprises determining whether a result of the second function is less than an acceptable internet signaling protocol latency based on a slowness of object reclamation.

16. The method of claim 15, wherein determining the first function comprises determining whether a result of the first function is less than an acceptable internet signaling protocol latency based on a slowness of heap reclamation.

* * * * *